United States Patent [19]
Bansal

[11] Patent Number: 5,389,321
[45] Date of Patent: * Feb. 14, 1995

[54] METHOD OF PRODUCING A SILICON CARBIDE FIBER REINFORCED STRONTIUM ALUMINOSILICATE GLASS-CERAMIC MATRIX COMPOSITE

[75] Inventor: Narottam P. Bansal, No. Olmsted, Ohio

[73] Assignee: The United States of America as represented by the Administrator of the National Aeronautics and Space Administration, Washington, D.C.

[*] Notice: The portion of the term of this patent subsequent to May 25, 2010 has been disclaimed.

[21] Appl. No.: 128,007

[22] Filed: Sep. 16, 1993

Related U.S. Application Data

[62] Division of Ser. No. 892,054, Jun. 4, 1992, abandoned.

[51] Int. Cl.$^6$ ............................................. C04B 35/80
[52] U.S. Cl. ........................................ 264/60; 264/63; 264/166; 264/332; 501/8; 501/95
[58] Field of Search ................... 264/60, 63, 166, 332; 501/8, 95

[56] References Cited

U.S. PATENT DOCUMENTS

| | | | |
|---|---|---|---|
| 2,582,993 | 1/1952 | Howatt | 264/63 |
| 4,589,900 | 5/1986 | Brennan et al. | 65/33 |
| 4,689,188 | 8/1987 | Bhatt | 264/60 |
| 4,725,567 | 2/1988 | Hillig | 501/87 |
| 4,788,162 | 11/1988 | Hillig | 501/5 |
| 4,917,941 | 4/1990 | Hillig et al. | 428/283 |
| 4,919,991 | 4/1990 | Gadkaree | 428/113 |
| 4,944,904 | 7/1990 | Singh et al. | 269/60 |
| 5,023,207 | 6/1991 | MacDowell | 501/8 |
| 5,089,194 | 2/1992 | Hoffmann | 264/166 |
| 5,160,676 | 11/1992 | Singh | 264/60 |
| 5,214,004 | 5/1993 | Bansal | 501/8 |

*Primary Examiner*—James Derrington
*Attorney, Agent, or Firm*—Gene E. Shook; Guy M. Miller

[57] ABSTRACT

A $SrO-Al_2O_3-2SrO_2$ (SAS) glass ceramic matrix is reinforced with CVD SiC continuous fibers. This material is prepared by casting a slurry of SAS glass powder into tapes. Mats of continuous CVD-SiC fibers are alternately stacked with the matrix tapes.

This tape-mat stack is warm-pressed to produce a "green" composite. Organic constituents are burned out of the "green" composite, and the remaining interim material is hot pressed.

13 Claims, 1 Drawing Sheet

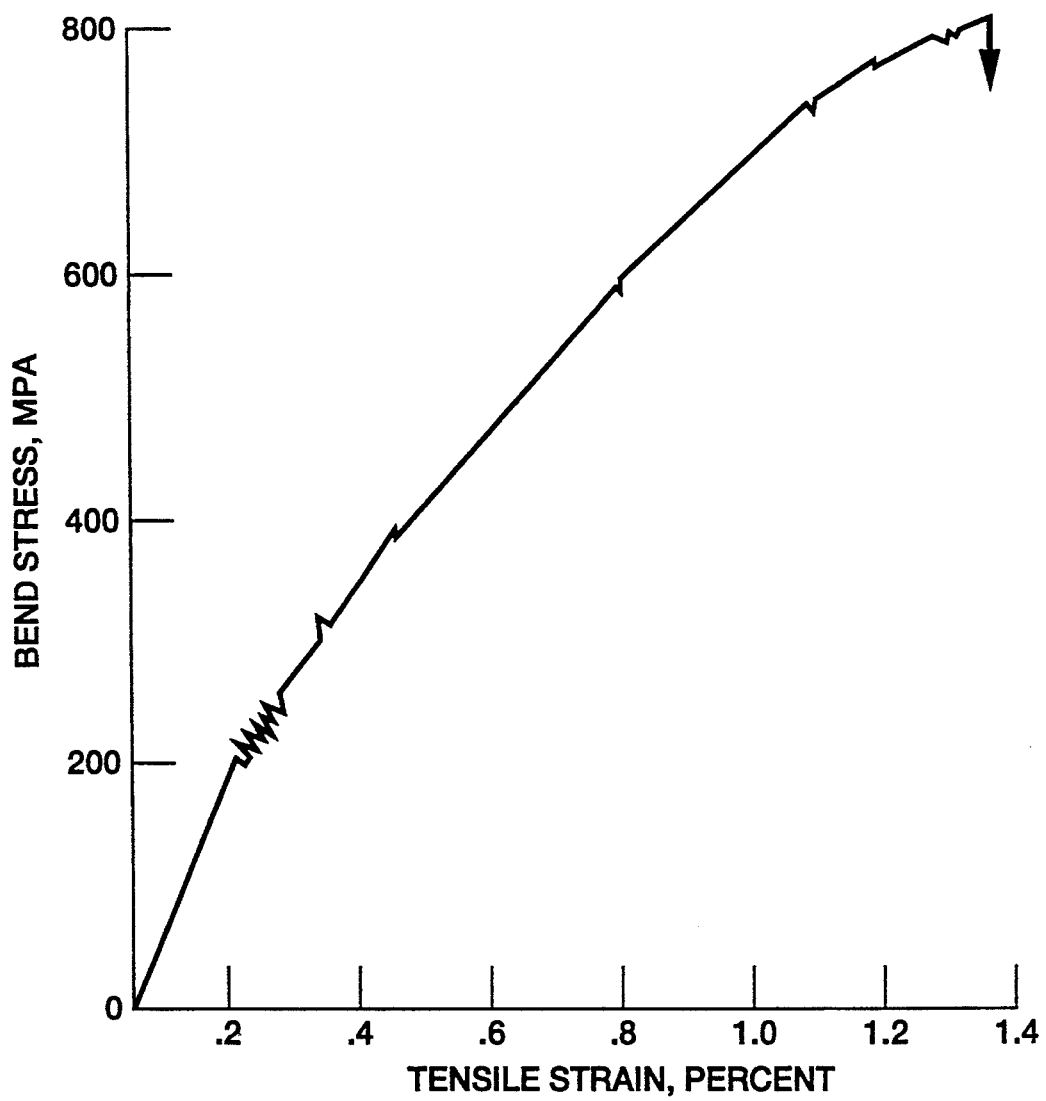

METHOD OF PRODUCING A SILICON CARBIDE FIBER REINFORCED STRONTIUM ALUMINOSILICATE GLASS-CERAMIC MATRIX COMPOSITE

ORIGIN OF THE INVENTION

The invention described herein was made by an employee of the U.S. Government and may be manufactured or used by or for the Government without the payment of any royalties thereon or therefor.

STATEMENT OF COPENDENCY

This application is a division of application Ser. No. 07/892,054 which was filed Jun. 4, 1992, now abandoned.

TECHNICAL FIELD

This invention is concerned with producing a silicon carbide fiber-reinforced strontium aluminosilicate glass-ceramic matrix composite. The invention is particularly concerned with a method of making a high strength ceramic fiber reinforced composite which is refractory, strong, and tough for applications as high temperature structural materials.

It has been suggested that lithium aluminosilicate, magnesium aluminosilicate (cordieritc), and calcium aluminosilicate glass ceramics reinforced with SiC fibers derived from polymers be used for such applications. Commercially available SiC fibers, known as Nicalon, have been satisfactory. However, the potential use of such prior art materials is limited to somewhat low temperatures of about 1000° C. to 1100° C.

The fabrication of a composite by infiltration of melt of SrO-Al$_2$O$_3$-SiO$_2$ (SAS) composition into a preform made out of SiC powder, SiC whiskers and CVD SiC fibers has been attempted. However, the fiber-reinforced composites made by this method showed no improvement in flexural strengths over the ones with no reinforcements.

It is, therefore, an object of the present invention to provide a new composite material having superior mechanical properties at high temperatures.

Another object of the invention is to provide a method of making a ceramic fiber-reinforced glass-ceramic matrix composite material for use in gas turbine and diesel engines.

BACKGROUND ART

Hillig U.S. Pat. No. 4,725,567 is directed to a composite material processed by infiltration. The object of the invention is the production of a high temperature composite material. Hillig U.S. Pat. No. 4,788,162 discloses a method for the production of high temperature composite materials. This patent notes that the SrSiO$_3$ has unique characteristics, such as expansion while freezing. The combination of CaSiO$_3$ and SrSiO$_3$ provides a material which is stable at a variety of temperature ranges.

Hillig and McGuigan U.S. Pat. No. 4,917,941 is directed to a ceramic matrix produced with continuous SiC fibers and a slip casting technique. A porous mold in the shape of the material desired is used in the process. It is capable of removing the liquid from the suspension leaving only the matrix material. Prior to drying, continuous SiC fibers are wrapped around the mold. The process may be repeated to add thickness to the material. Drying occurs in an ambient environment.

Gadkaree U.S. Pat. No. 4,919,991 is concerned with another composite. The only pertinency of this patent is the use of SrSiO$_3$ as an alternative material in the composite structure. Singh et al U.S. Pat. No. 4,944,904 discloses a ceramic matrix having a boron nitride coating. A carbon cloth is dipped into a slurry layer into a preform. At this point infiltration is used to form the composite.

DISCLOSURE OF THE INVENTION

The objects of the invention are achieved with a fiber-reinforced composite which is composed of a SrO—Al$_2$O$_3$—2SiO$_2$ (SAS) glass ceramic matrix that has been reinforced with CVD SiC continuous fibers. The method of assembly includes preparing a slurry of SAS glass powder and casting this slurry into tapes. After the tapes are dried they are cut to the proper size.

Continuous CVD-SiC fibers are formed into mats of the desired size. The matrix tapes and the fiber mats are alternately stacked in the proper orientation. This tape-mat stack is warm pressed to produce a "green" composite.

The "green" composite is then heated to an elevated temperature to burn out organic constituents. The remaining interim material is then hot pressed to form a SAS glass-ceramic fiber-reinforced composite which may be machined to size.

DESCRIPTION OF THE DRAWING

The objects, advantages and novel features of the invention will be more fully apparent from the following detailed description when read in conjunction with the accompanying drawing which is a graph showing three point flexural stress-strain behavior of a 24 volume percent silicon carbide fiber-reinforced SAS glass-ceramic composite material at room temperature.

BEST MODE FOR CARRYING OUT THE INVENTION

The composite of the present invention is produced by a tape method in which an aqueous slurry of SAS glass powder along with a fugitive organic binder, plasticizer, glycerine, and surfactant is prepared. Glass powders having an average particle size of about 2.5 μm have been satisfactory. A binder identified as Methocel 20-214 which is a commercially available material from the Dow Chemical Company has been suitable. A plasticizer known commercially as Polyglycol E-400 from the Dow Chemical Company has been adequate. A surfactant material sold commercially as Triton X-100 has provided satisfactory results.

This slurry is first ball milled and then cast into tapes. This may be facilitated by using a doctor blade. After the tape has dried, it is cut to size. The composition of the matrix is preferably about 31.8 w/o SrO, about 31.3 w/o Al$_2$O$_3$, and about 36.9 w/o SiO$_2$. This composition is also expressed as 25 mole % SrO, 25 Mole % Al$_2$O$_3$, and 50 mole % SiO$_2$.

Continuous CVD SiC SCS-6 fibers that were supplied by Textron Specialty Materials are wound onto a drum. Commercially available adhesive tape is used to hold the fibers in their proper position on the drum. The fibers are then cut into unidirectional mats of desired predetermined size whose fiber orientation and integrity are maintained by the adhesive tape.

The required number of matrix tapes and fiber mats are alternately stacked in a desired orientation in a warm press die. After stacking, this material is warm pressed to produce a "green" composite.

The "green" composite is then removed from the warm press die and wrapped in either graphite foil or molybdenum foil. The wrapped "green" composite is loaded into a hot pressing die where it is heated to an elevated temperature between about 400° C. to 500° C. to burn out organic constituents to produce an interim material.

The interim material is then hot pressed under vacuum using temperatures of 1200° C.–1500° C., a pressure of 2 to 4 KSI, and a time of 15 to 120 minutes. After cooling to room temperature and pressures, the resulting composites are then removed from the die.

A number of the composites were cut into test bars for flexural strength measurements and other characterizations. Referring to the drawing there is shown a graph of the 3-point flexural stress-strain behavior for a 24 volume percent SiC fiber/SAS glass-ceramic composite material. Unidirectional composites having room temperature 3-point flexural stress of greater than 1000 MPa have been fabricated with 27 volume percent fiber loading.

While the preferred embodiment of the invention has been shown and described, it will be appreciated that various modifications may be made to the invention without departing from the spirit thereof or the scope of the subjoined claims. This silicon carbide fiber-reinforced SAS glass-ceramic matrix composite is a new and improved structural material. The composite fabricated by the aforementioned method has mechanical properties superior to existing materials and a potential for use at temperatures as high as 1450° C. to 1500° C.

What is claimed:

1. A method of producing a ceramic fiber-reinforced glass-ceramic matrix composite comprising the steps of
    preparing an aqueous slurry of $SrO-Al_2O_3-2\ SiO_2$ (SAS) glass powder, an organic binder, a plasticizer, glycerine, and a surfactant,
    ball milling said slurry,
    casting said slurry into tape thereby forming a glass-matrix tape,
    drying said glass matrix tape,
    cutting said glass matrix tape to a predetermined size,
    winding continuous chemical vapor deposition (CVD) SiC fibers onto a drum,
    cutting said fibers on said drum thereby forming a fiber mat,
    alternating a plurality of said glass matrix tapes with a plurality of said fiber mats thereby forming a tape-mat stack,
    warm pressing said tape-mat stack thereby forming a "green" composite,
    wrapping said "green" composite in foil,
    heating said wrapped "green" composite whereby organic constituents are burned out thereby forming an interim material, and
    hot pressing said interim material to produce a silicon carbide fiber reinforced SAS glass-ceramic matrix composite.

2. A method as claimed in claim 1 wherein the (SAS) glass powder has an average particle size of about 2.5 μm.

3. A method as claimed in claim 1 wherein the plasticizer in the slurry is polyglycol.

4. A method as claimed in claim 1 wherein the organic constituents are burned out at about 400° C. to about 500° C.

5. A method as claimed in claim 1 wherein the SiC fiber comprises about 24 volume percent of the composite.

6. A method as claimed in claim 1 wherein the "green" composite is wrapped in graphite foil.

7. A method as claimed in claim 1 wherein the green composite is wrapped in molybdenum foil.

8. A method as claimed in claim 1 wherein said "green" composite is hot pressed at a temperature between about 1200° C. and about 1500° C.

9. A method as claimed in claim 8 wherein the hot pressing occurs at a pressure between about 2 KSI and about 4 KSI.

10. A method as claimed in claim 9 wherein said hot pressing occurs at a time between about 15 minutes and about 120 minutes.

11. In a method of forming a silicon carbide fiber-reinforced glass-ceramic matrix composite the steps of
    alternating a glass matrix tape composed of about 31.8 w/o SrO, about 31.3 w/o $Al_2O_3$ and about 36.9 w/o $SiO_2$, organic binder, plasticizer, glycerine and surfactant with a fiber mat comprising about 20 percent to about 40 percent by volume of silicon carbide fibers thereby forming a tape-mat stack
    warm pressing said stack thereby forming a "green" composite
    heating said "green" composite thereby burning out organic material therefrom,
    hot pressing the resulting material at a temperature of about 1200° C. to about 1500° C. for about 15 minutes to about minutes at a pressure of about 2 KSI to about 4 KSI thereby producing a silicon carbide fiber-reinforced glass-ceramic matrix composite, and
    cooling said composite to room temperature.

12. A method as claimed in claim 9 wherein the plasticizer is polyglycol.

13. A method as claimed in claim 11 wherein the composite comprises about 24 volume percent SiC fibers.

* * * * *